United States Patent

[11] 3,585,846

| | | |
|---|---|---|
| [72] | Inventor | Leonard E. Broberg<br>Milwaukee, Wis. |
| [21] | Appl. No. | 766,587 |
| [22] | Filed | Oct. 10, 1968 |
| [45] | Patented | June 22, 1971 |
| [73] | Assignee | A. O. Smith Harvestore Products, Inc.<br>Arlington Heights, Ill. |

[54] INDICATING AND MONITORING MEANS FOR DETECTING CONDITION OF SEALED STORAGE STRUCTURES
5 Claims, 4 Drawing Figs.

[52] U.S. Cl.................................................. 73/52, 116/70
[51] Int. Cl.......................................................... G01m 3/00
[50] Field of Search.......................................... 73/52, 409, 418, 392; 116/70; 52/29, 39

[56] References Cited
UNITED STATES PATENTS

| 2,512,134 | 6/1950 | Baule ........................... | 73/52 X |
| 2,689,481 | 7/1954 | Quiat............................ | 116/70 UX |
| 3,193,058 | 7/1965 | Ebbinghaus................... | 52/29 |
| 3,222,933 | 12/1965 | Howard........................ | 73/418 |

Primary Examiner—Louis R. Prince
Assistant Examiner—William A. Henry, II
Attorney—Andrus, Sceales, Starke & Sawall ABSTRACT: For detecting the functioning of a sealed storage structure, a sealed housing is secured to the exterior of an airtight storage structure immediately above an entrance doorframe. A tube is interconnected to the bottom wall of the housing and the top cross member of the doorframe to provide communication between the interior of the storage structure and the housing. An inflatable monitoring bag is secured within the housing and connected by a vent tube to the exterior of the housing. The interior of the monitoring bag is subjected to the atmospheric pressure and the exterior of the bag is subjected to the structure pressure. The physical condition of the monitoring bag during any given period provides an indication of whether the storage structure is experiencing a pressure cycle.

PATENTED JUN22 1971                                  3,585,846

INVENTOR.
LEONARD E. BROBERG
BY
Andrus, Sceales, Starke & Sawall
Attorneys

INDICATING AND MONITORING MEANS FOR DETECTING CONDITION OF SEALED STORAGE STRUCTURES

This invention relates to an indicating and monitoring means for detecting the condition and functioning of a sealed storage structure and particularly an essentially airtight storage structure having a flexible bag means mounted therein to balance the internal pressure with the atmospheric pressure and thereby prevent establishment of excessive differential pressures across the joints of the structure.

Large storage structures such as silos for handling of food and other similar products are often subject to widely varying temperature changes during any given 24-hour period. If the structure is formed to be airtight, a substantial pressure differential can be established across the sealed joints as a result of the normal daily temperature fluctuations and seasonal variations.

A highly satisfactory sealed storage structure for food products and the like is shown in U.S. Pat. No. 3,193,058. The storage structure, as more fully described therein, is formed of a plurality of curved plates coated on the interior and exterior surfaces with a suitable vitreous enamel. The plates are interconnected by suitable bolting or the like with a fluidtight sealing means disposed therebetween to form a generally fluidtight storage structure. As more fully described therein, stored food products and the like are subject to rapid deterioration if substantial amounts of air are passed through the storage structure. If the structure is maintained in a fluidtight condition, the stored food normally generates carbon dioxide which acts as a preservative and which also maintains the structure under a slight internal pressure condition to exclude the entrance of air. A breather bag is preferably supported within the storage structure and includes at least one outlet interconnected to a roof opening to expose the interior of the bag to atmospheric pressure while the exterior of the bag is exposed to the pressure within the storage structure. As the structure pressure falls, the structure gases contract and the breather bag expands to compensate for the gas volume change.

The present invention is particularly directed to a means for determining the operating condition of the sealed structure in relation to the ambient, and in particular whether or not the structure is experiencing a daily pressure cycle. Generally, in accordance with the present invention, a small flexible test member is mounted within a housing which is mounted to the exterior of the storage structure and connected through a suitable communicating passageway to the interior of the storage structure. The pressure within the storage structure is thus transmitted to the housing and to one surface of the flexible member. An opposite surface of this member is exposed to the ambient pressure. As a result, the test member flexes depending upon whether the structure pressure is negative or positive with respect to the environmental or ambient pressure. As a result, the condition of the flexible test member is a direct indication of the pressure changes. If no change in the condition of the flexible test member is noted over a period of time, there is a need for inspection of the storage structure as such.

In a particularly novel construction of the present invention, a sealed enclosure or housing is secured to the exterior of the storage structure immediately adjacent an entrance door. A pressure connecting tube is interconnected to the sealed housing and through the doorframe to the interior of the storage structure. An inflatable member is secured within the housing and connected by a vent tube to the exterior of the housing. In this manner the interior of the bag is subjected to the ambient pressure and the exterior of the bag is subjected to the structure pressure. The pressure differences will either cause the test bag to expand to a taut condition or to collapse and curl up in accordance with the relative pressure within the structure with respect to the atmosphere. The user, by noting the condition of the test bag during any given period, can readily determine whether or not the interior of the storage structure is experiencing a pressure cycle and thereby determining whether the structure is maintaining its sealed condition.

The drawing furnished herewith illustrates the best mode presently contemplated by the inventor of carrying out his invention and clearly discloses the above advantages and features, as well as others, which will be readily understood from the following description.

Figure 1:
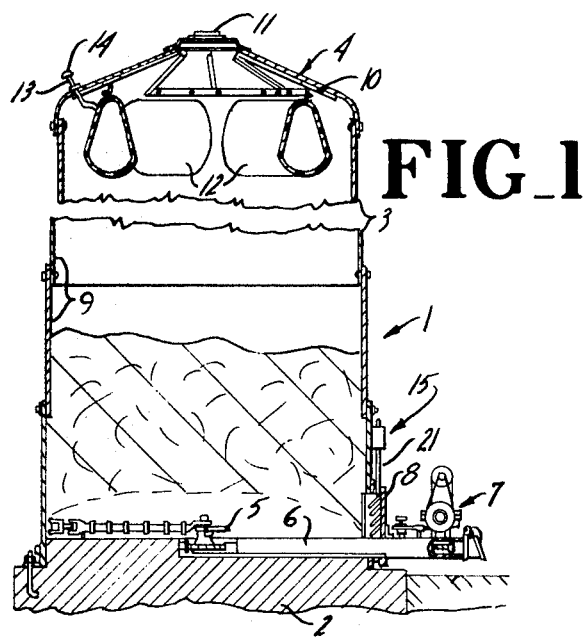
FIG. 1 is a vertical section through a silo-type storage structure incorporating an indicating and monitoring means constructed in accordance with the present invention.
Figure 3:
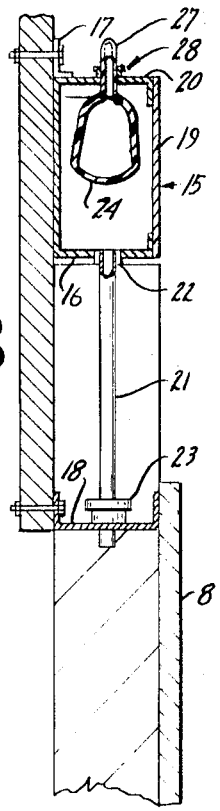
FIG. 3 is a vertical section taken on line 3–3 of FIG. 2 more clearly illustrating certain details of construction of the present invention.
Figure 2:
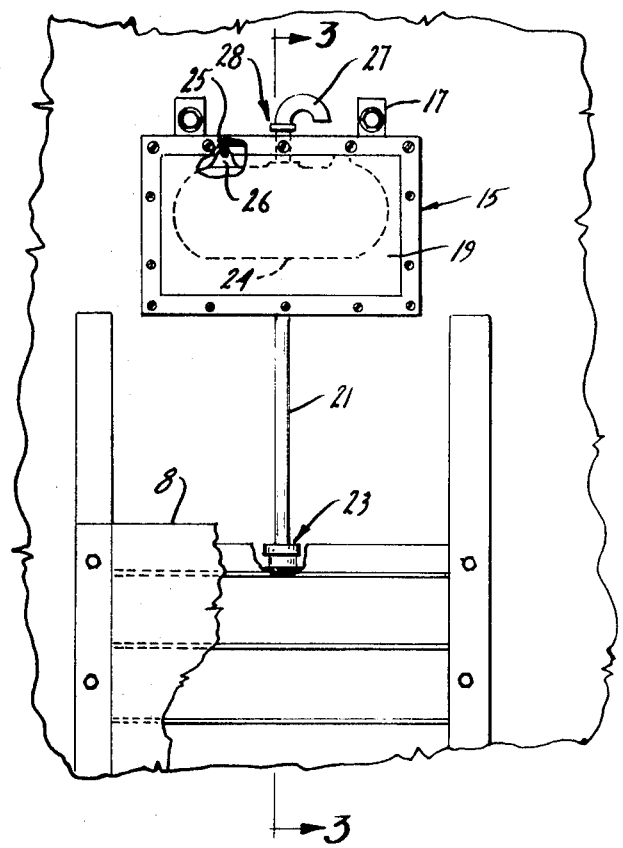
FIG. 2 is an enlarged front elevational fragmentary view showing the embodiment of the present invention shown in FIG. 1.

Referring to the drawing and particularly to FIG. 1, a storage structure 1 such as a silo is shown supported on a suitable concrete foundation 2. The silo may, for example, be employed to store perishable material such as silage, haylage, high-moisture corn and the like which is preferably protected so far as practical from air and the like to minimize oxidation and spoilage of the product.

The illustrated silo structure is similar to that disclosed in the previously referred to U.S. Pat. No. 3,193,058 and generally includes an outer cylindrical shell 3 enclosed by an upper roof 4. A bottom unloading structure 5 is disposed in the lower portion of the silo 1 and includes a discharge conveyor mechanism 6 located within a trough in the concrete foundation 2. The unloader structure 5 is adapted to continuously remove stored material from the bottom of the silo 1 and discharge it through the trough to the exterior of the storage structure 1. Generally, the drive 7 for the unloading structure 5 is supported exteriorly of the structure immediately adjacent to the trough exit and suitably connected to drive the mechanism, for example, as more fully disclosed in the above patent. Further, the storage structure 1 is provided with a removal door 8 adjacent the discharge area to permit insertion and removal of the unloading structure and afford entrance to the structure proper.

The shell 3 is formed of a series of generally curved plates 9 formed of a vitreous enamel or glass-coated steel. The plates 9 are bolted together or otherwise interconnected with mastic sealed joints.

The roof 4 is similarly composed of a series of interconnected coated segments 10 secured to each other and to the upper end of the cylindrical shell 3 to maintain a fluidtight enclosure of the stored material. The roof 4 is preferably provided with a central filling hole having a releasable cap 11 and the like.

Generally, a pair of semicircular breather bags 12 are secured to the interior portion of the roof 4 in a suitable manner and constructed to generally conform to the curvature of the adjacent portion of the silo structure. Each bag 12 includes a vent pipe 13 extended outwardly through a sealed opening in the roof 4. The outer end of the outlet or vent pipe 13 is provided with a weather cap 14 to prevent rain and other foreign materials from entering into the bag assembly.

In the operation, the bags 12 breathe to compensate for pressure changes within the storage structure, thereby effectively admitting and expelling air with respect to the interior of the structure without in fact allowing the air, and in particular the oxygen therein, to contact the stored material. Thus, in the heat of the day, the gases inside of the structure 1 expand. The increased pressure collapses the breather bag and forces the air stored therein outwardly through the vents. In contrast, during the night, or whenever the environment is such that the gases within the structure are cooled, they will contract and tend to establish a relatively negative pressure within the storage structure 1. The bags 12 will fill with air and minimize the negative pressure within the storage structure.

In accordance with the present invention, an indicating and monitoring means 15 is provided exteriorly of the storage structure 1 to continuously provide an indication of whether or not the storage structure is experiencing a pressure cycle. If it is not, the sealed condition of a structure is faulty and inspection and correction is probably required.

The illustrated embodiment of the invention includes a sealed housing 16 which is mounted by suitable brackets 17 to the side of the storage structure 1 immediately above the door 8. The door 8 is mounted on a rectangular frame 18 which is secured to the side of the shell 3 and extends outwardly to define a planar surface for receiving the door.

The housing 16 is generally a rectangular airtight metal box having a front transparent window wall 19 bolted, or otherwise secured, to the adjacent frame of the box with a sealing gasket 20 disposed therebetween. A conduit or tube 21 is secured to the central bottom wall of the housing 16 and extends downwardly to the silo doorframe 18. The tube 21 is shown welded or otherwise secured in an opening in the bottom wall of the housing 16 and to the upper wall 22 of frame 18 by a suitable sealing coupling 23 to freely communicate with the housing and the storage structure.

An elongated tubular bag 24 which in a preferred construction is formed of a suitable rubberlike plastic or other resilient material is mounted within the airtight housing 16. In the illustrated embodiment of the invention, a plurality of hooks 25 are provided on the interior upper wall of the housing and the bag 24 is provided with a plurality of apertured tabs 26 which mate with hooks 25 to support the bag.

A vent tube 27 is secured to the top central portion of the bag and projects upwardly through a sealing coupling 28 in the top wall of the housing 16.

Figure 4:
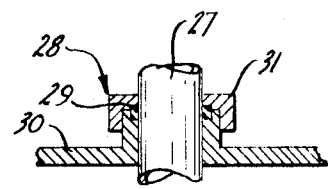
FIG. 4 is an enlarged fragmentary view of sealing structure shown in FIGS. 2 and 3.

The coupling 28 for example may as most clearly shown in FIG. 4 include a suitable packing 29 disposed within a boss 30 through which tube 27 passes, with the packing 29 compressed about the tube 27 by a clamping nut 31. Coupling 23 may be similarly constructed.

The interior of the sealed box or housing 16 is therefore subjected to the pressure in the sealed storage structure 1 and is always equal thereto. The corresponding structure pressure is applied to the exterior of the monitoring bag 24. The vent tube 27, however, applies ambient pressure to the interior of the bag 24. Consequently, the same relative pressures applied to the main breather bags 12 are similarly applied to the monitoring bag 24. A higher positive pressure existing within the structure results in the collapse of the monitoring bag. Similarly, a relative negative pressure within the structure with respect to atmospheric pressure results in an expansion of the monitoring bag 24 to a taut condition. The condition of the bag 24 therefore provides a direct indication of the pressure within the storage structure and changes in the inflated condition of the bag directly indicates changes in the pressure within the storage structure. As long as there is a change in the condition of the bag 24 during normal temperature variations of the atmosphere, an indication is obtained that the sealed storage structure is functioning properly. Conversely, the lack of change in the monitoring bag 24 indicates the lack of a pressure cycle within the storage structure with respect to the atmosphere and the need for inspection and/or correction.

Although a preferred construction of the monitoring means is illustrated, any other similar system can readily be employed, as long as it provides a continuous monitoring of the relative pressure differential existing across the sealed storage structure with normal variations in the environmental conditions to which it is subjected.

Various modes of carrying out the invention are contemplated as being within the scope of the following claims particularly pointing out and distinctly claiming the subject matter which is regarded as the invention.

I claim:

1. In a generally sealed storage structure for storing perishable materials which generate a self-preserving gas, an exterior door on said storage structure, a doorframe connected to and defining an outwardly extension of said storage structure, means to secure the door to the doorframe, a fluidtight monitor housing substantially smaller than said storage structure and attached to said storage structure adjacent said frame, a passageway means connected between the doorframe and the housing, and an inflatable means in said housing including a movable wall having one side exposed to the interior of the housing and the opposite exposed to the ambient.

2. In a generally sealed storage structure of substantial size to store a large quantity of a perishable material, the storage structure having a doorframe defining an outward extension of the sealed structure; the improvement comprising:
a housing connected to the storage structure;
a conduit means connected to an opening in the doorframe and to the housing to establish free fluid communication therebetween; and
an inflatable member in said housing having one surface in communication with the ambient pressure and an opposite surface in communication with said conduit means to provide a continuous indication of pressure differentials existing between the storage structure and the ambient by flexing.

3. A pressure monitoring apparatus for a storage structure adapted to contain a large quantity of perishable material; the apparatus comprising:
a small generally fluidtight housing which is substantially smaller than said storage structure;
connecting means for attaching said housing to the storage structure and providing a passageway therebetween;
an inflatable member supported in said housing and having a movable wall; and
connecting means for providing fluid communication into said housing for exposing one side of said wall to the storage structure atmosphere and exposing the opposite side of said wall to the ambient.

4. The monitoring apparatus of claim 3 wherein said housing includes a front viewing window and said chamber unit includes an inflatable tubular bag having a plurality of support means connected to the bag and the top of the said housing to support the bag adjacent said viewing window, a vent tube connected to said bag and extending outwardly through a sealed opening in said housing.

5. A pressure monitoring apparatus for a storage structure adapted to contain a large quantity of perishable material; the apparatus comprising:
a generally fluidtight monitor housing which is substantially smaller than said storage structure;
means to attach said housing to the storage structure and providing fluid communication therebetween;
a front viewing window on said housing;
an inflatable bag supported within said housing adjacent said viewing window;
a vent tube connected to said bag and extending outwardly through said housing for providing fluid communication between the bag and the ambient; and
means to seal the housing to the vent tube.